US010313218B2

(12) United States Patent
Every et al.

(10) Patent No.: US 10,313,218 B2
(45) Date of Patent: Jun. 4, 2019

(54) MEASURING AND COMPENSATING FOR JITTER ON SYSTEMS RUNNING LATENCY-SENSITIVE AUDIO SIGNAL PROCESSING

(71) Applicant: 2236008 Ontario Inc., Waterloo (CA)

(72) Inventors: Mark Robert Every, Surrey (CA); Leona Arlene Neufeld, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 15/675,359

(22) Filed: Aug. 11, 2017

(65) Prior Publication Data

US 2019/0052555 A1 Feb. 14, 2019

(51) Int. Cl.
| | |
|---|---|
| *H04B 15/00* | (2006.01) |
| *H04L 12/26* | (2006.01) |
| *H04M 3/22* | (2006.01) |
| *H04L 12/58* | (2006.01) |
| *H04M 3/28* | (2006.01) |
| *G10L 19/16* | (2013.01) |

(52) U.S. Cl.
CPC ............ *H04L 43/087* (2013.01); *H04L 51/04* (2013.01); *H04M 3/2236* (2013.01); *H04M 3/28* (2013.01); *G10L 19/167* (2013.01)

(58) Field of Classification Search
CPC .............................. G06F 3/165; H04L 43/087
USPC ......................................... 381/71.1, 71.4, 93
See application file for complete search history.

(56) References Cited

U.S. PATENT DOCUMENTS

| | | | |
|---|---|---|---|
| 9,246,545 | B1 | 1/2016 | Ayrapetian et al. |
| 2002/0046288 | A1 | 4/2002 | Mantegna et al. |
| 2003/0093267 | A1 | 5/2003 | Leichtling et al. |
| 2009/0238377 | A1 | 9/2009 | Ramakrishnan et al. |
| 2014/0254816 | A1 | 9/2014 | Kim et al. |
| 2016/0321028 | A1* | 11/2016 | Doerbecker ............ G06F 3/162 |

OTHER PUBLICATIONS

EPO, Extended European Search Report relating to EP application No. 18188425.5, dated Nov. 27, 2018.

* cited by examiner

*Primary Examiner* — Katherine A Faley
(74) *Attorney, Agent, or Firm* — Rowand LLP

(57) ABSTRACT

A system and method receives one or more captured signals through a captured audio path and produces one or more playback signals through a playback audio path. The system and method executes one or more signal processing functions and measures the delays within the playback audio path and captured audio path during operation of the one or more signal processing functions. The system and method stores the measured delays in a memory and compensates the one or more signal processing functions for the playback delay and the capture delay.

19 Claims, 5 Drawing Sheets

MEASURING AND COMPENSATING FOR JITTER ON SYSTEMS RUNNING LATENCY-SENSITIVE AUDIO SIGNAL PROCESSING

BACKGROUND OF THE DISCLOSURE

1. Technical Field

This disclosure relates to a system level architecture and specifically to measuring and/or compensating for latency.

2. Related Art

In real-time signal processing systems, there are delays associated with capture and playback of audio signals. These delays may be fixed or may change each time a system runs. If the variation is small, systems are not affected. However, when variations become significant "latency-sensitive" systems are affected.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
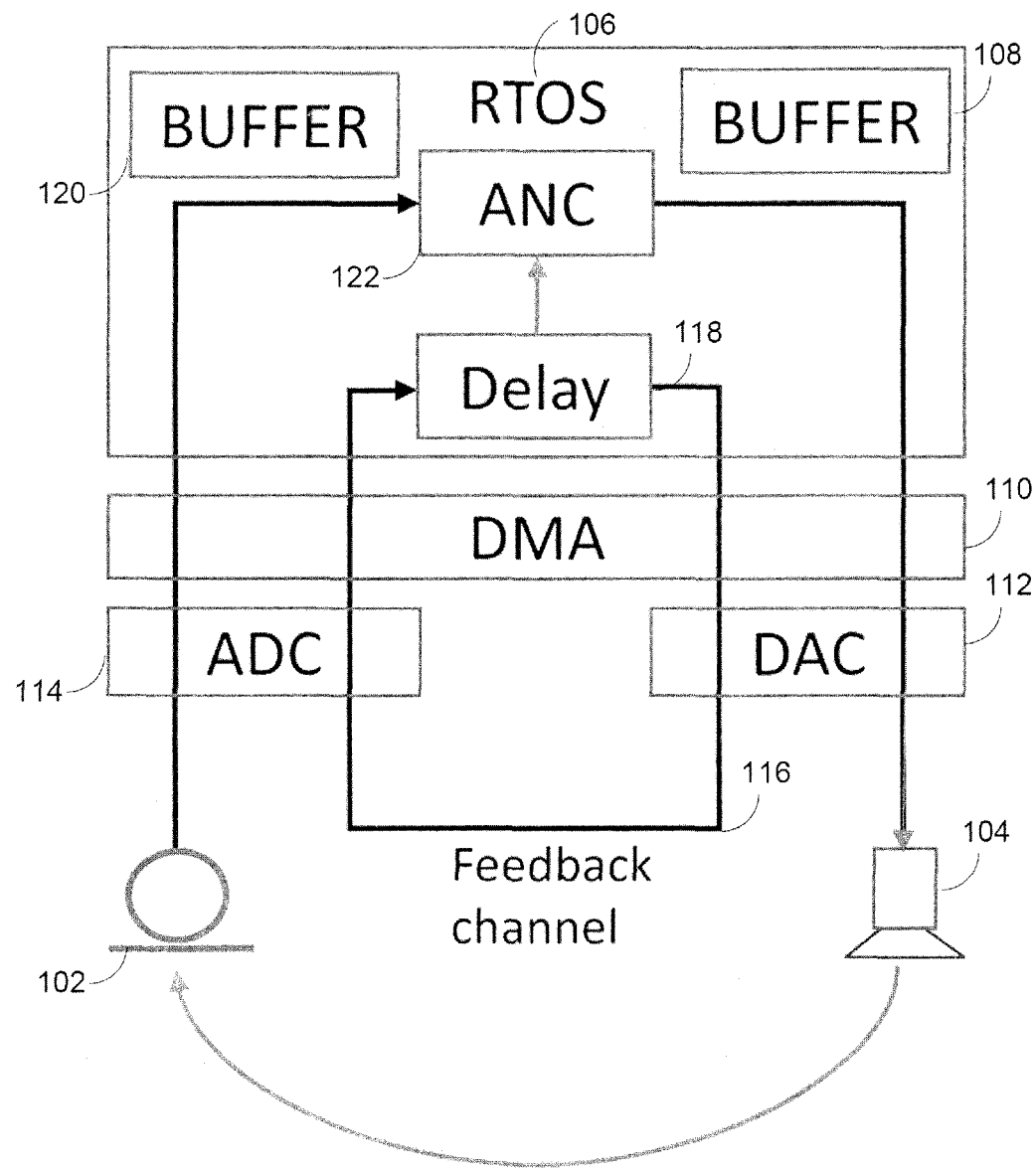
FIG. 1 is a block diagram of a delay measuring and compensating system.

Digital audio processing systems use digital signal processors, graphical processors, microprocessors, field-programmable gate arrays, and other processors to receive and render audio content. Infotainment systems, amplifiers, and mobile phones often process audio content. These systems process content through batch processes, real-time processes, or near real time processes. A real-time operating system may run on these systems, and may schedule many parallel and unrelated operations that compete for the system's computational resources.

When processing signals captured by microphones or sensors that convert physical stimuli such as sound into electrical signals, some systems experience processing delays. Similarly, processing delays occur when rendering digital playback signals from loudspeakers. These delays may be caused by analog and digital signal conversions, sampling, filtering and transport conversions (e.g., over wireless mediums such as a Bluetooth or an Ethernet connection), for example. They are also occur in systems that do not synchronize to a common clock. Some processes execute nondeterministic algorithms that exhibit different behaviors at different runtimes. These algorithms perform differently for many reasons including: different interrupt sequences and differences in the time required to respond to uncontrolled events. In audio processes, variability is caused by differences in access times to buffers, differences in capturing audio signals, differences in the processing times consumed to replicate audio samples, etc.

Some signal processing applications do not run effectively when capture and playback delays are neither fixed nor known. These systems may be time sensitive and may be susceptible to error when operating conditions change unexpectedly. Acoustic echo cancellation (AEC), in-car communication (ICC) systems, active noise control (ANC) systems, and feedback control systems are latency-sensitive audio signal processing applications. AEC may make assumptions about the relative delay between a downlink voice signal played out of a loudspeaker in a vehicle and the echo that is captured at the microphone. If this delay is incorrectly assumed, the estimated model of the echo path impulse response may not capture correctly either the beginning (early reflections) or end (echo tail) of the actual echo path. An AEC will also make assumptions that the echo path changes only slowly over time. In either of these cases if the playback or capture delay is incorrectly estimated, echo leakage may result, for example causing the far-end talker on a call to hear their own voice back at them with some delay. On the other hand, if the AEC algorithm knows that the system adds a certain playback plus capture delay when processing samples (excluding the acoustic delay), it may determine that the first samples of the echo impulse response are zero. In other words, the AEC system need not estimate the first samples, and preserve the system processing capabilities. The remaining samples of the impulse response may thereafter be estimated using a fixed echo tail length that is long enough to cover the known acoustic reverberation time of the vehicle cabin, allowing the AEC to fully cancel the echo. Alternatively, if the playback or capture delay changes in real-time and the amount by which it changes is known, the AEC may adjust its internal estimate of the echo path impulse response and maintain consistent echo cancellation performance. Some adaptive filter algorithms that estimate the echo paths in this system include a normalized least mean square (NLMS) process, a recursive least mean square (RLS) process, and affine projection. When latency is known, whether it is measured at boot up or continuously, the AEC systems performs more effectively, at an improved quality, at fewer instructions per second.

Another latency-sensitive audio signal processing application is an ICC system, where the driver's voice is picked up at a front microphone, processed to form a reinforcement signal, and played out over the rear loudspeakers in the vehicle (in a front-to-back reinforcement) to allow the rear passengers to hear the driver more clearly. Since a feedback path exists from the rear loudspeakers to the front microphone, a feedback canceller is often necessary to prevent uncontrolled build-up of feedback or howling. Like an AEC, the feedback canceller may model the feedback path as an impulse response (e.g., a time series or individually within sub-bands), and benefits from knowing the actual system delay. For example, the known system delay may assist the feedback cancellation algorithm in distinguishing between a feedback component at a microphone vs. the direct acoustic path from the driver to the microphone, and therefore perform feedback cancellation effectively without lowering the voice quality of the reinforcement signal.

Another latency-sensitive audio signal processing application reduces unwanted sound by the addition of another signal, also known as ANC. ANC relies on precise timing to actively cancel or dampen unwanted sound. In ANC, a secondary path is the transfer function between a given loudspeaker and microphone, for example, represented as an impulse response or frequency response. The secondary path delay is the time it takes for an output signal transmitted from an ANC application to be detectable at the microphone input to the ANC application. The secondary path delay is a sum of the capture delay, the playback delay, and the acoustic delay (e.g., that occurs when a signal travels from a loudspeaker to a microphone) that may occur within an enclosure like a vehicle cabin. Calibration is the process of measuring the secondary paths from all loudspeakers to all microphones, and is usually carried out at a tuning stage prior to normal operation of the system. Many ANC systems operate effectively only when their current operating environment is similar to the environment in which they were calibrated. ANC algorithms such as FxLMS (Filtered-x Least Mean Squares) and Normalized FxLMS have a limited tolerance to jitter. For example, if the phase of a secondary path changes by more than about 45 degrees relative to its value at calibration at a given frequency, the ANC system is likely to become unstable and potentially increase noise levels in the vehicle cabin. At 100 Hz (a period T=10 ms), 45 degrees is equivalent to a delay of (45/360)*10 ms=1.25 ms.

To measure latency, the disclosed systems measure playback and capture delay on real-time systems. During an audio capture event, data are moved in blocks or fragments through a capture path. The timing of the transfer depends on the interrupt that initiates a capture event. Similarly, data block movement through a playback audio path is controlled by interrupts that are generated by a playback event. The use of synchronous clocks guarantees that the number of audio samples captured within a given time period is equivalent to the number of audio samples played back during that same time period, but does not guarantee the alignment between the capture block interrupts and the playback block interrupts. Variability can be caused by the components sourcing the audio to the capture hardware and the playback hardware, storage delays, payload differences, etc. One method of measuring the time difference between the capture and playback interrupts relies on a synchronization time referred to as a sync point. A sync point occurs when the boot up sequences for both a capture event and a playback event are complete. When the sync point is established, the variability measurement calculates the position of a common-sample undergoing a capture event relative to the position of that same common-sample undergoing playback event to determine the difference in timing. The measurement may result in the counting the number of audio samples and/or audio buffers in the capture audio path and the playback audio path.

The sync sample position in a capture process measures the granular position of the data blocks within the capture hardware and the intervening process blocks between the hardware and the acoustic processing algorithm input. Thus, the sync sample position for a capture application may consider the position of the process blocks in some or all of the I/O buffering, ADC, decoding, copying of data, sample rate conversion, filtering, and other data transport. Similarly, for playback applications, the sync sample position includes the granular position of the data blocks within the playback hardware and the intervening process blocks between hardware and the acoustic processing algorithm output. A sync sample position for a playback application may consider the position of the process blocks in some or all of the IO buffering, DAC, encoding, copying of data, sample rate conversion, filtering, and other data transport. For both a capture application and a playback application, if the sample length of any of the intervening process blocks between the hardware and the acoustic processing algorithm are deterministic (e.g., meaning they do not vary between boot up sequences), those intervening process blocks need not be measured in both capture and playback applications in alternative systems. In these alternative systems, only the position of the data blocks where the sample length is nondeterministic are measured because the deterministic process blocks do not vary in time. The deterministic process blocks produce the same measurements for each boot up sequence.

To ensure that the latency between a playback event and, capture is maintained after a boot sequence, the number of complete blocks (not the granular position within those blocks) may be measured at the sync point at each capture interrupt, and at each playback interrupt. If the number of complete data blocks processed between the sync point changes, data blocks or portions thereof may be added or dropped to the capture audio path to maintain alignment and compensate for the change in latency. In some signal processing applications, the applications may add or subtract fractional delays to the secondary impulse responses of the signal processing application.

An alternative system for measuring playback and capture delay (e.g., a sum) on latency sensitive systems such as AEC, ICC, feedback control and ANC, utilizes a feedback channel that passes synchronously through some or all the components of the capture and playback audio paths. These systems generate and play a known test signal over a feedback channel, measuring the response at a captured input channel, and calculate the delay between the two. For example, in FIG. 1 an ANC system runs within a real-time operating system; it is configured with a single-microphone input 102 and single-loudspeaker output channel 104. In this system, the real-time operating system (RTOS) 106, direct memory access (DMA) 110, digital-to-analog devices (DAC) 112 and analog-to-digital (ADC) device 114 are potential sources of jitter. Other sources of jitter are also monitored in alternative systems. In FIG. 1, a feedback channel 116 connects inputs and outputs to a delay measurement module 118, which may be a unitary part of or an integrated part of the ANC application. The feedback channel passes synchronously through the RTOS output buffers 108, DMA 110, DAC 112, ADC 114, DMA 110 and RTOS input buffers 120. The feedback signal is not passed through the physical transducers, and therefore is not audible within an enclosure such as a vehicle cabin, however it passes through some or all of the components of the system that introduce jitter. At each stage, the feedback signal is processed synchronously with the other audio channels to ensure that the feedback signal is delayed by the same amount. When a test signal is played over the feedback channel (an impulse, sine-sweep, or random noise signal, for example) the delay of the feedback path is measured at boot-up and/or continuously during run-time.

Figure 2:
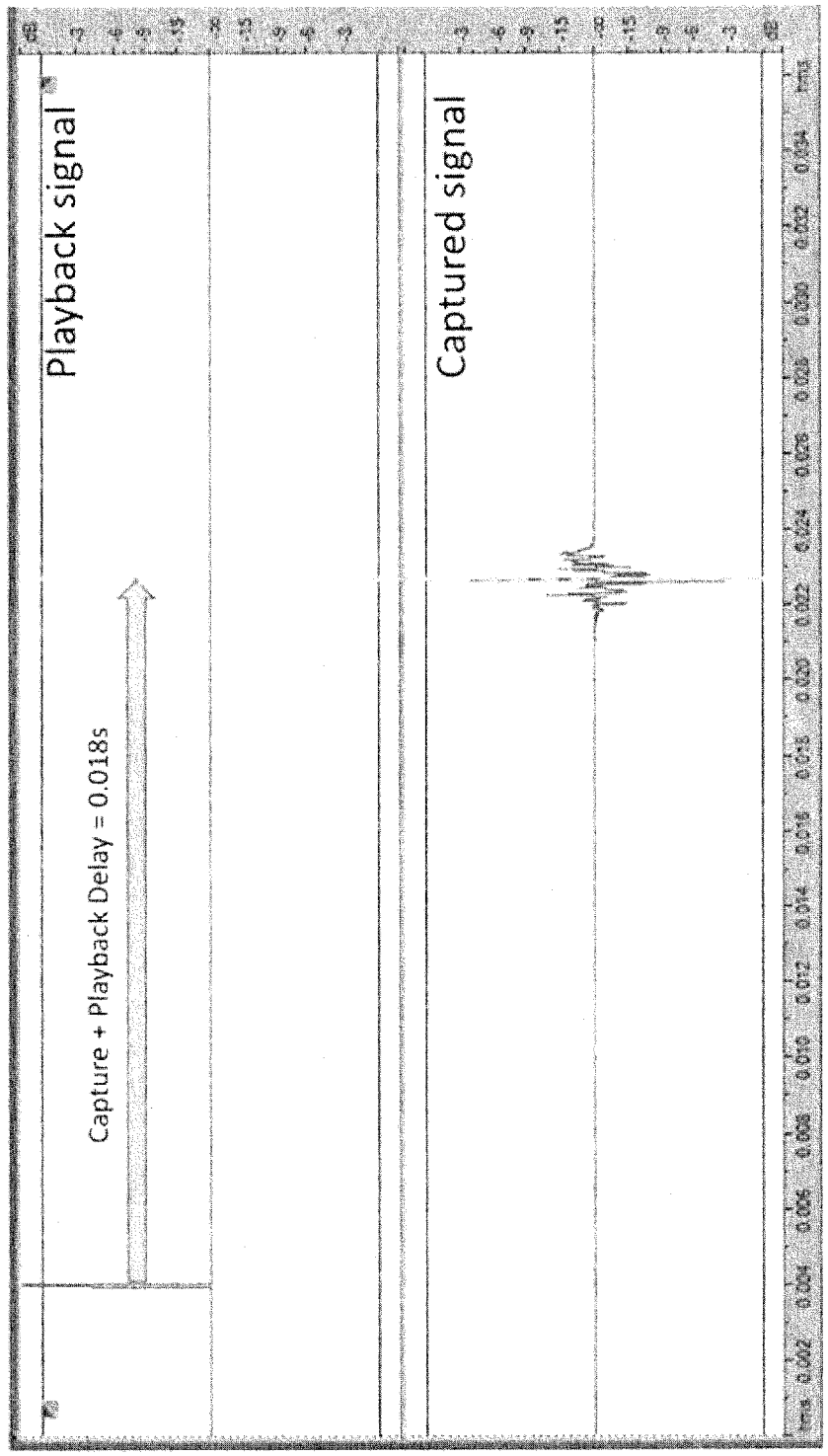
FIG. 2 shows a measured delay of an impulse response test signal rendered over a feedback channel.

In operation, an impulse is played over the feedback channel as shown in FIG. 2 and at the 18 ms relative point the impulse is captured at the input of the delay module 118. By measuring the delay between the maxima of both waveforms, measuring the lag corresponding to the maximum of the cross-correlation of the two signals, or by other processes, the delay module 118 measures latency.

To compensate for jitter, a delay measurement module such as the delay measurement module 118, shown in FIG. 1, measures a playback plus capture delay of dcalib (e.g., delay of the feedback channel 116 at the time that a signal processing application is calibrated) in samples. The delay module 118 informs the signal processing applications (e.g., ANC, AEC, ICC, feedback cancellation) what the current delay is, and/or calculates a difference between the current delay and the stored delay measured at some reference point in time. The dcalib in samples may be stored in memory with the calibration data. In the ANC system of FIG. 1, the calibration data consists of impulse response measurements from each loudspeaker to each microphone or a related measurement, e.g. frequency-domain representations of the transfer functions from loudspeakers to microphones.

In EQ. 1, IRcalib_kj[n] is the impulse response measured at calibration from loudspeaker k to microphone j as a function of time in samples "n". At a later stage, such as after boot-up and/or during run-time, for example, the delay measurement module 118 passes a different measured delay "d" to the ANC application 122. Here, IR_kj[n] is the impulse response processed by the ANC algorithm that adapts the ANC control filters. In the ANC algorithm, such as a Filtered-x Least Mean Squares algorithm, reference signals (e.g., sinusoidal-tones at the engine orders driven off the RPM) are filtered through the impulse responses to render the filtered-x terms ("Fx" terms). IR_kj [n] may be calculated by EQ. 1.

$$IR\_kj[n]=IRcalib\_kj[n+(dcalib-d)] \qquad \text{Eq. 1}$$

If the secondary path transfer functions are alternatively stored in the frequency domain, Hcalib_kj [f] will represent the complex frequency response from loudspeaker "k" to microphone "j" measured at some frequency "f" in Hz measured at calibration time and "fs" is the sample rate. The corresponding frequency response calculated at run-time (H_kj[f]) may be expressed by EQ. 2:

$$H\_kj[f]=Hcalib\_kj[f]\exp(i2pi(dcalib-d)f/fs) \qquad \text{Eq. 2}$$

In some systems, ANC is run at a lower sampling rate (fsANC) than the host application calling it. The host application may be running media playback, voice processing, etc. If the playback/capture delay "d" is measured at "fs" but is applied to the impulse responses in ANC stored at the lower sample rate fsANC, then a fractional sample delay of the impulse responses may be applied. In such systems, fractional delays of a time series may be implemented through interpolating filters.

Figure 3:
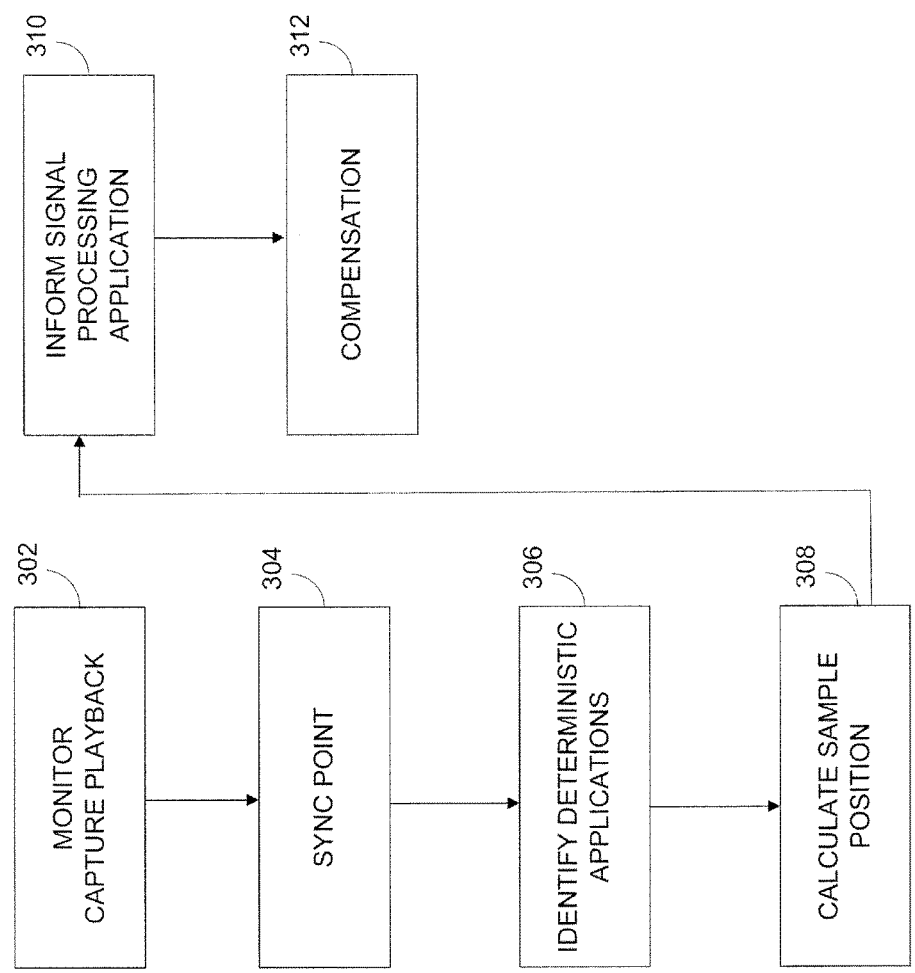
FIG. 3 is a process for measuring playback and capture delay.
Figure 4:
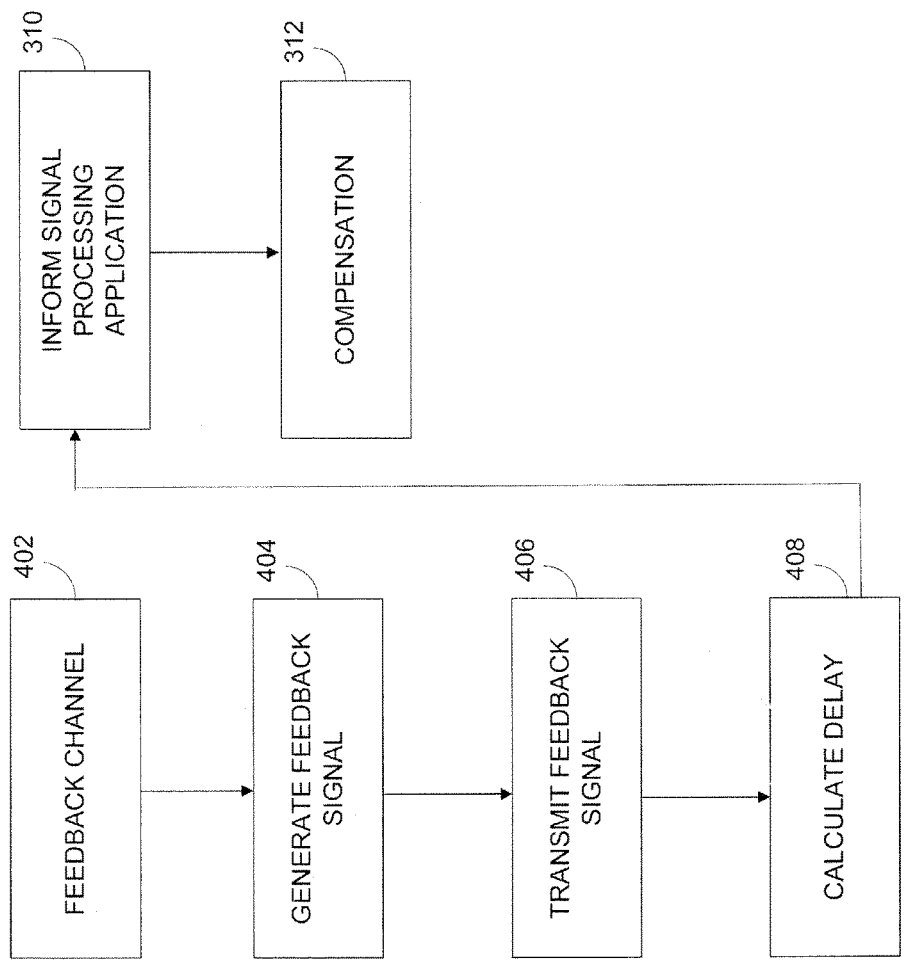
FIG. 4 is a second process for measuring playback and capture delay.

In operation, a process may measure playback and capture delay on a real-time system as shown in FIGS. 3 and 4. In FIG. 3, measuring the time difference between the capture and playback block interrupts involves first determining when both capture and playback event are complete on boot up at 302. A sync point is then established at 304. At 306 the process monitors the sample length of any of the intervening process blocks between the hardware and the acoustic processing algorithm that do not vary between boot sequences. These intervening process blocks may be left out of the calculation and only the position of the blocks that vary in time are used in the calculation of the boot sequence time difference. At 308 the process calculates the exact sample position in the block currently between captured relative to the sample position in the block currently being played out at that sync point to measure latency or jitter as described above. At 310, the process informs the one or more signal processing applications (e.g., ANC, AEC, ICC, feedback cancellation) what the current delay is, or alternatively calculates a difference between the current delay and the stored delay measured at some reference time. In some applications estimates of the secondary paths from the loudspeakers to the microphones are adjusted in response to the current delay, in some applications integer or fractional sample delays of the secondary path impulse response are applied in response to the current delay, in some applications the current delay establishes the initial delay in echo paths at optional 312. In other signal processing applications, data blocks are dropped or added in the capture audio path to compensate for the latency, or the phase response of the secondary paths are adjusted at 312.

FIG. 4 is an alternate process which may measure playback and capture delay on a real-time system. In FIG. 4, a feedback channel is established that connects inputs and outputs to a delay measurement process, which may be part of one or more signal processing applications (e.g., ANC, AEC, ICC, feedback cancellation) or a separate software module at 402. At 404, a test signal (e.g. an impulse, sine-sweep, or random noise signal) is generated that is processed synchronously with the other audio channel that renders sound. The feedback signal passes synchronously through some or all of the components of the capture and feedback paths but is not passed through physical transducers. By this structure, the test signal is not audible within an enclosure like a vehicle cabin; however, it passed through all the components of the audio path under test that introduce jitter. The signal is transmitted at 406 and delay is calculated by the processes described above at 408. At 310, the process informs the one or more signal processing applications (e.g., ANC, AEC, ICC, feedback cancellation) what the current delay is, or alternatively calculates a difference between the current delay and the stored delay measured at some reference time. At optional 312, compensation occurs as described above.

Figure 5:
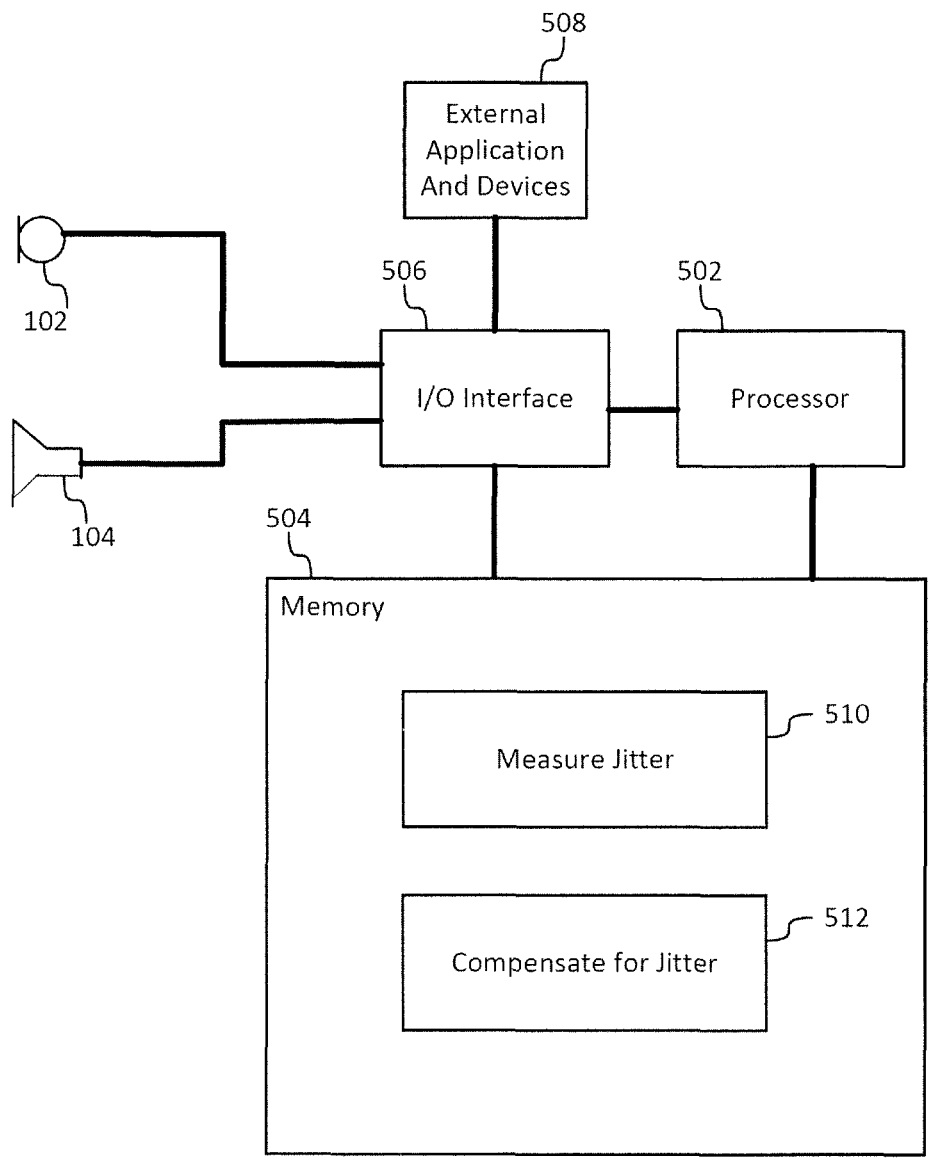
FIG. 5 is vehicle with a delay measuring and compensating system.

FIG. 5 is a block diagram of a vehicle that measures and compensates for jitter. The system comprises a processor 502, a non-transitory media such as a memory 504 (the contents of which are accessible by the processor 502) and an I/O interface 506. The I/O interface 506 connects devices and local and/or remote applications such as, for example, additional microphones, audio transducers or loudspeakers, and one or more signal processing applications (e.g., ANC, AEC, ICC, feedback cancellation). The memory 504 may store instructions which when executed by the processor 502 causes the system to render some or all of the functionality associated with the measuring and or compensating for jitter. For example, the memory 504 may store instructions which when executed by the processor 502 causes the system to render the functionality associated with measuring or calculating jitter 510 for ANC, AEC, ICC, feedback cancellation, and/or etc., and compensating 512 for the jitter.

The processors 502 may comprise a single processor or multiple processors that may be disposed on a single chip, on multiple devices, or distributed over more than one system. The processors 502 may be hardware that executes computer executable instructions or computer code embodied in the memory 504 or in other memory to perform one or more features of the systems described herein. The processor 502 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 504 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an automated echo cancellation occurs, echo is removed by subtracting an estimated echo from the transmitted or received signal.

The memory 504 may also store a non-transitory computer code, executable by processor 502. The computer code may be written in any computer language, such as C, C++, assembly language, channel program code, and/or any combination of computer languages. The memory 504 may store information in data structures including, for example multiband compressor/limiter tunable parameters including one or more one or more crossover frequencies, amplitude thresholds, compression ratios, time constants, attack and release times, look-ahead parameters, etc.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The systems and processes reinforce and enhance audio signal processing. The systems automatically measure jitter in real-time operating systems and compensate for latency within one or more audio signal processing applications to maintain quality. The system can be implemented within vehicle systems such as an infotainment processor and digital signal processors or DSPs and co-exist and communicate with other system software. A vehicle may include without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system for real-time audio signal processing that receives one or more captured signals through a captured audio path which includes a microphone, and produces one or more playback signals through a playback audio path which includes a speaker, and executes one or more signal processing functions comprising:
    a processor configured to measure a playback delay corresponding to delays of the playback audio path and a capture delay corresponding to delays of the captured audio path during operation of the one or more signal processing functions, wherein measuring the playback delay and the capture delay includes measuring delay of a test signal played and received over a feedback channel, and wherein the feedback channel passes through components of the playback audio path and the captured audio path that produce jitter, and wherein the test signal is processed synchronously with the one or more captured signals and the one or more playback signals, and wherein the test signal is not output through the speaker; and
    a memory for storing the measured delays;
    where the processor is further configured to compensate the one or more signal processing functions for the playback delay and the capture delay.

2. The system of claim 1, wherein measuring the playback delay and the capture delay occurs when the processor first boots up.

3. The system of claim 1, wherein measuring the playback delay and the capture delay occurs continuously during the operation of the one or more signal processing functions.

4. The system of claim 1 where measurement of the playback delay and the capture delay determines a synchronization time, when boot-up of a playback event and capture event is completed.

5. The system of claim 1 where the processor is further configured to compare the measured playback delay and the capture delay to prior measurements of playback delay and capture delays stored in memory.

6. The system of claim 5 where the processor is configured to modify the one or more signal processing functions when the measured playback delay and the capture delay change relative to prior measurements.

7. The system of claim 5 where time differences between the compared measurements adjust the delay of the capture and/or playback audio paths by dropping or adding samples to the capture and/or playback audio paths.

8. The system of claim 1 where measurement of the playback delay and capture delay comprise counting the number of audio samples and/or audio buffers in the capture audio path and the playback audio path.

9. The system of claim 1 where the one or more signal processing functions include an active noise control.

10. The system of claim 9 where the playback delay and capture delay adjust offline estimates of a secondary path from loudspeakers to microphones.

11. The system of claim 10 where adjusting the secondary path estimates comprise integer or fractional sample delays of secondary path impulse responses.

12. The system of claim 10 where adjusting the secondary path estimates comprise modifying the phase responses of the secondary path.

13. The system of claim 1 where the one or more signal processing functions comprise an echo cancellation and a feedback cancellation.

14. The system of claim 13 where estimated echo paths are adjusted in response to measured playback and capture delays.

15. The system of claim 1 where the system comprises a vehicle.

16. A method that receives one or more captured signals through a captured audio path which includes a microphone, and produces one or more playback signals through a playback audio path which includes a speaker, and executes one or more signal processing functions comprising:

measuring a playback delay corresponding to delays of the playback audio path and a capture delay corresponding to delays of the captured audio path during operation of the one or more signal processing functions, wherein measuring the playback delay and the capture delay includes measuring delay of a test signal played and received over a feedback channel, and wherein the feedback channel passes through components of the playback audio path and the captured audio path that produce jitter, and wherein the test signal is processed synchronously with the one or more captured signals and the one or more playback signals, and wherein the test signal is not output through the speaker;

storing the measured delays in a memory; and compensating the one or more signal processing functions for the playback delay and the capture delay.

17. The method of claim 16, wherein measuring the playback delay and the capture delay occurs during the first boot up.

18. The method of claim 16, wherein measuring the playback delay and the capture delay occurs continuously during the operation of the one or more signal processing functions.

19. A non-transitory machine-readable medium encoded with machine-executable instructions for receiving one or more captured signals through a captured audio path which includes a microphone, and producing one or more playback signals through a playback audio path which includes a speaker, wherein execution of the machine-executable instructions is for:

measuring a playback delay corresponding to delays of the playback audio path and a capture delay corresponding to delays of the captured audio path during operation of the one or more signal processing functions, wherein measuring the playback delay and the capture delay includes measuring delay of a test signal played and received over a feedback channel, and wherein the feedback channel passes through components of the playback audio path and the captured audio path that produce jitter, and wherein the test signal is processed synchronously with the one or more captured signals and the one or more playback signals, and wherein the test signal is not output through the speaker;

storing the measured delays in a memory; and compensating the one or more signal processing functions for the playback delay and the capture delay.

\* \* \* \* \*